Sept. 24, 1968 R. G. WALKER ET AL 3,402,462
PROCESS AND APPARATUS FOR ASSEMBLING COILS
Filed Oct. 23, 1965 4 Sheets-Sheet 1

INVENTORS.
ROBERT G. WALKER
and DONALD E. HILL
BY
Jeffers and Young
ATTORNEYS

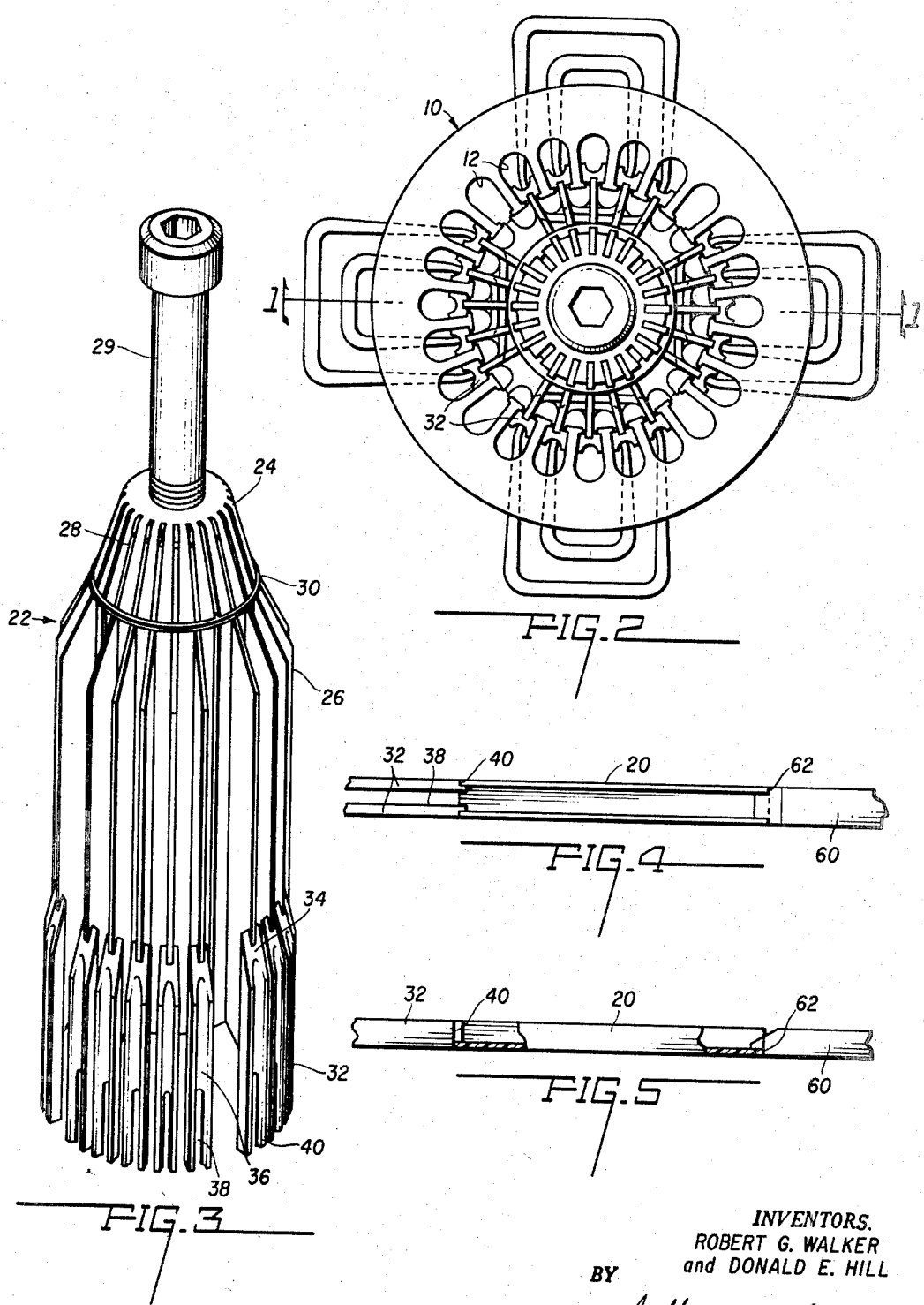

INVENTORS.
ROBERT G. WALKER
and DONALD E. HILL
BY

*Jeffers and Young*

ATTORNEYS

United States Patent Office 3,402,462
Patented Sept. 24, 1968

3,402,462
PROCESS AND APPARATUS FOR
ASSEMBLING COILS
Robert G. Walker and Donald E. Hill, Fort Wayne, Ind.,
assignors to Industra Products, Inc., Fort Wayne, Ind.,
a corporation of Indiana
Filed Oct. 23, 1965, Ser. No. 502,893
9 Claims. (Cl. 29—596)

ABSTRACT OF THE DISCLOSURE

Auxiliary coils are placed over previously inserted main coils in stator slots by apparatus which compresses the main coils, inserts the auxiliary coils while the main coils are under compression, and inserts a wedge over the inserted auxiliary coils.

This invention relates to improved process and apparatus for assembling coils in the slots of stators or the like. More particularly, this invention relates to the inserting of prewound starter coils in the slots of stators having. positioned therein main coils in the form of loose windings of conductor wire, said coils then having a wedge which is inserted endwise into the slot as a covering for the windings.

In the prior art, there have been numerous attempts to form the coils in electric motors into the slots by means of winding heads. In distinction to this method, the present invention relates to a process and apparatus for assembling prewound coils in the slots of stators. The assembly of prewound coils was previously performed by tedious, time consuming procedures which necessarily added cost and delay in the manufacturing and assembling of the article. One of the difficulties in assembling prewound coils of wire, such as auxiliary windings over the main windings, is that the loose mass of coils tends to spring out and completely fill the slot and, therefore, must be compressed in order to make room for the auxiliary sets of coils. It was a cumbersome operation to attempt to fit a prewound auxiliary coil into a slot already filled with loose coils of the main winding. It proved difficult also to assemble a wedge into the slot over the surface of the wound coils at the end of the assembly procedure. These difficulties are for the most part overcome in the present invention by a novel process and apparatus for assembling coils into the slots of stators or the like, and having the various objects and features hereafter described.

One of the main objects of the present invention is to provide a process and apparatus for quickly and efficiently positioning the combination main coil and auxiliary coil into slots of the stators.

It is an important feature of the invention that the auxiliary coil is a prewound coil which can be provided at economical cost of fabrication and can be quickly and accurately assembled into the slot over the main coil and then overlaid with a wedge material of suitable construction.

It is a further object of the present invention to provide novel process means for wedging the coils of a main set of coils more tightly into the slot to make room for the auxiliary coils which are accurately and rapidly placed and fitted into position.

It is a further object of the present invention to provide a novel apparatus which performs in sequence, at preferred stages of operation, a wedging of the main coils to make room for insertion of the auxiliary windings or coils and to effect such insertion of auxiliary windings while the main coils or windings are under compression so that there is adequate room for the auxiliary coils, and thereafter inserting a wedge through the slot while the coils are suitably compressed to permit such insertion.

It is an important feature of the present invention that an apparatus can be operated wherein the auxiliary coils are simply placed in convenient locations on the apparatus and the apparatus will then quickly and automatically effect placement of the auxiliary windings or coils and overlie the prewound auxiliary coils with a wedge which is inserted into the slot.

These operations are far beyond the speed of conventional assembly techniques and, therefore, it is more economical to produce the product and such manufacture can take place in a shorter time.

The above and other objects and features of the invention will become apparent from a consideration of the following description which proceeds with reference to the accompanying drawings, wherein:

FIGURE 2 is an end view of the apparatus shown in FIGURE 1;

FIGURE 3 is an isometric view of the body, fins, and irons for assembling the coils;

FIGURE 4 is an enlarged partial top view of the end of the iron, the wedge to be inserted, and the pusher;

FIGURE 5 is a front elevation view of the structure shown in FIGURE 4;

Figure 6:
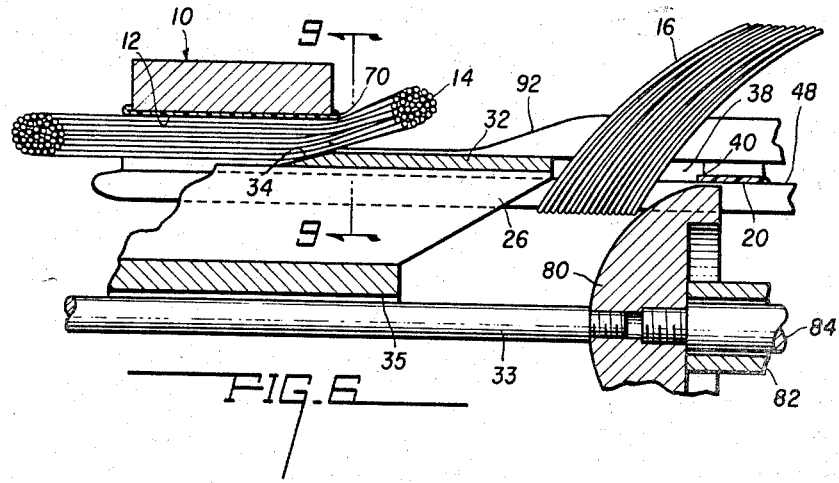
Figure 7:
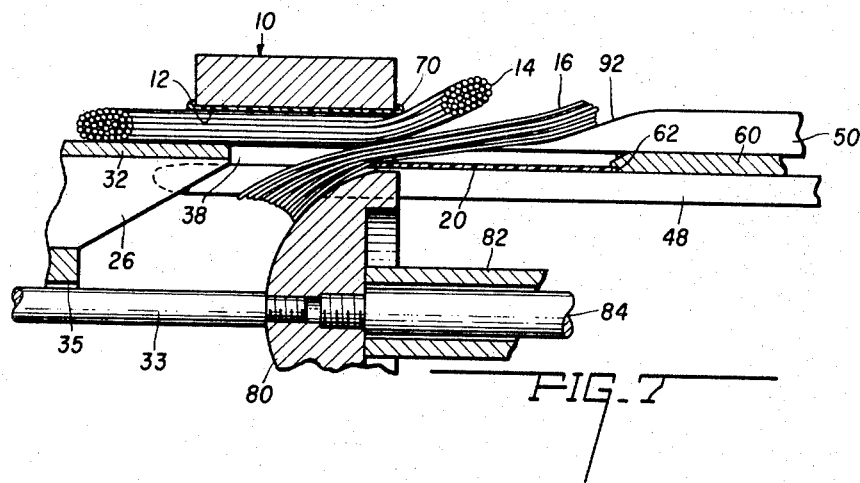
Figure 8:
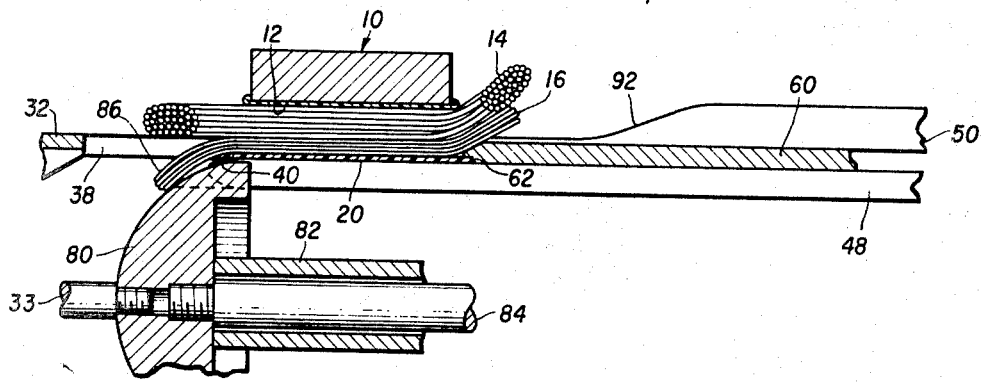
Figure 9:
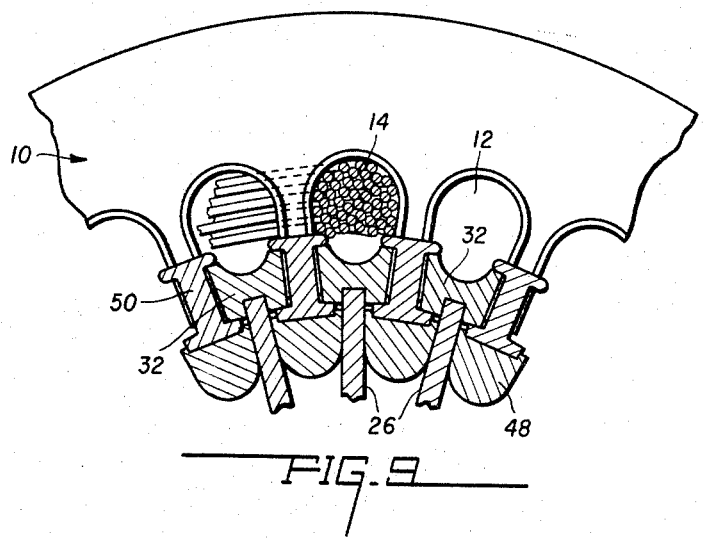
Figure 10:
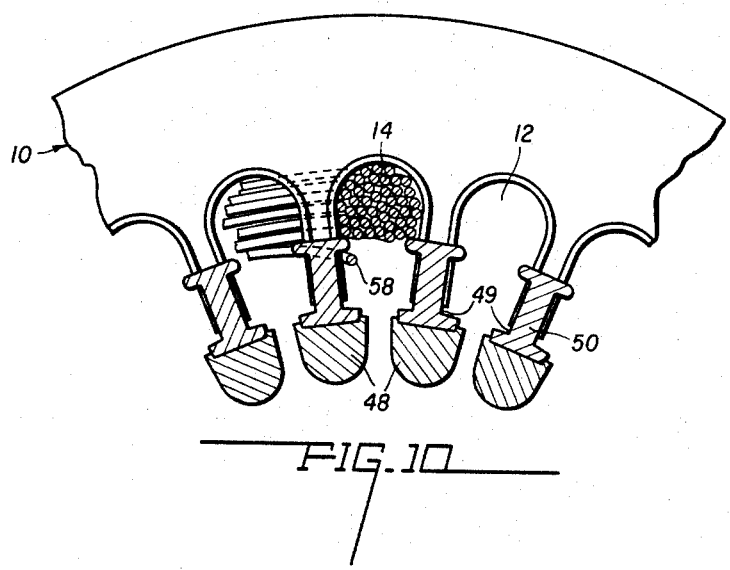

FIGURES 6, 7 and 8 are enlarged detail sectional views showing the passage of the iron through the slot, and the passage of the stripper and the wedge, whereby the auxiliary coil is fitted into the slot and is overlaid by the wedge; and, FIGURES 9 and 10 are enlarged partial detail views, taken on line 9—9 of FIGURE 6, of the stator as the fins and irons move into position and with the fins and irons removed.

Figure 1:
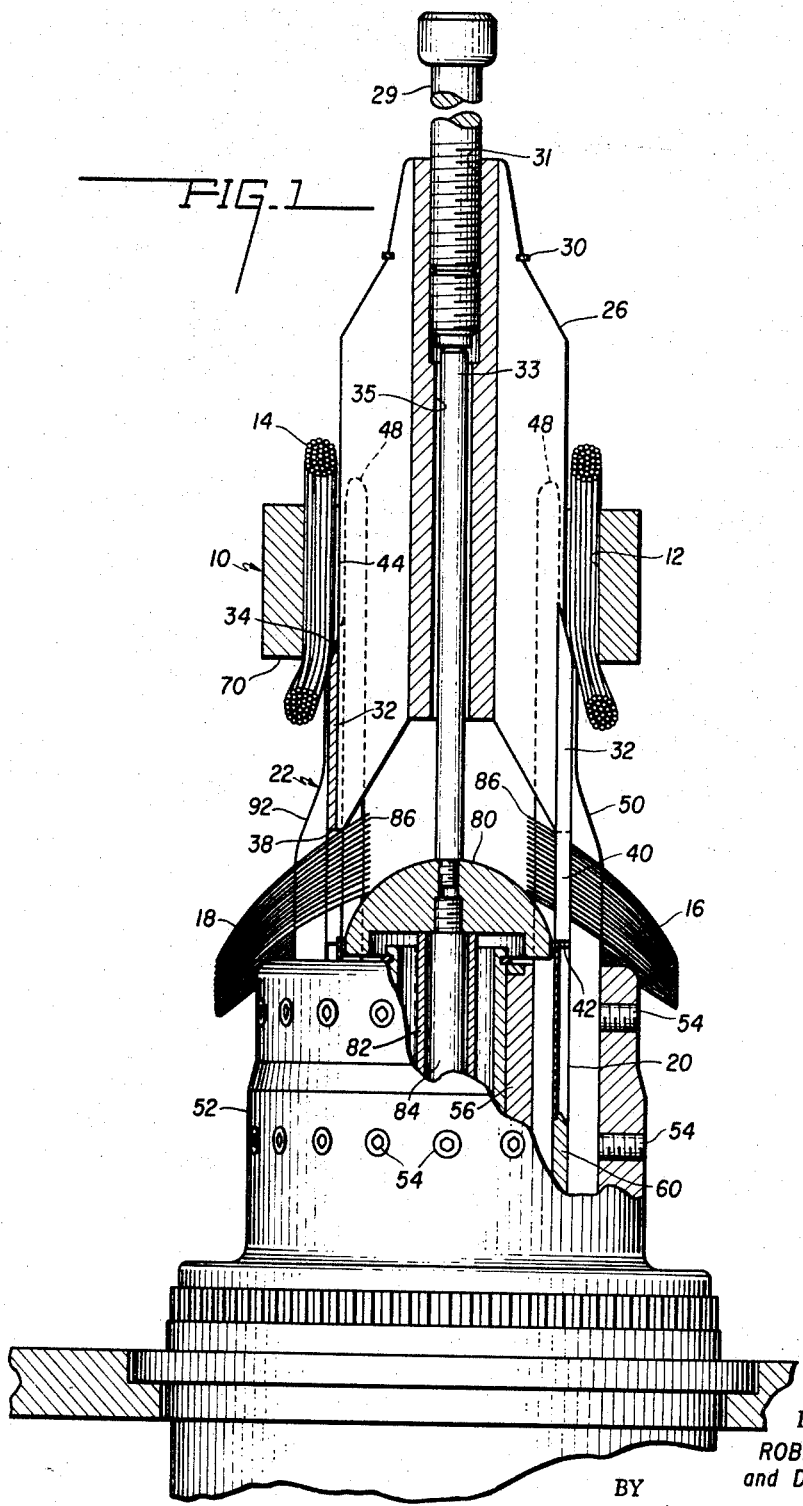
FIGURE 1 is a longitudinal sectional view of the apparatus taken on line 1—1 of FIGURE 2 and is shown extending through a stator wherein the main coils are placed in the slots and the auxiliary coils are in position for insertion.

Referring now to the drawings, a stator 10 has its slots 12 initially filled with main coils or windings 14 comprised of conductor wire of suitable metallic composition. These coils 14, as shown in FIGURE 6, tend to fill the slots 12 and interfere with the insertion of prewound auxiliary coils 16, 18 (FIGURE 1). To insert such coils 16, 18 into the slots 12 and then overlay them with a wedge 20, there is provided an apparatus designated generally by reference numeral 22. The apparatus 22 comprises a body 24 (FIGURE 3) having a number of fins 26 which are received within slots 28 and which are held therein by a retaining ring 30. An adjuster pin 29 is threadedly received in opening 31, and bears against a rod 33 in passage 35 (FIGURE 1). Each fin 26 has fixedly mounted thereon an iron 32 with an inclined tapered face 34, a groove 36, and a slot 38 at its lower end 40. As indicated in FIGURE 1, the lower end 40 of the iron 32 has a notch 42, the purpose of which is to guide a wedge 20 which is to be inserted endwise into each of the slots 12.

The apparatus 22 is supported on and moved by the rod 33, which in turn is attached to and moved by a stripper 80. The apparatus 22 passes through a central opening 44 of the stator 10. The apparatus 22 has a number of stationary fingers 48 which are disposed at circumferentially spaced locations around a finger support 56 in a housing 52. The fingers 48 are held in place by wedge guides 50. The wedge guides 50, the fingers 48, the housing 52, and the finger support 56 are held in fixed relation to each other. Between each adjacent pair of wedge guides 50 is a wedge pusher 60 which moves with the stripper 80. Each wedge pusher 60 has a tapered and notched end 62 (FIGURES 4 and 5) that engages the wedge 20 and inserts it in place.

The auxiliary coils 16, 18 are placed in the spaces between one finger 48 and wedge guide 50 (FIGURE 1) and between an adjacent finger 48 and wedge guide 50. The stator 10 with its already mounted main coils 14 is positioned on top of the wedge guides 50 and supported with its teeth (that form the stator slots 12) resting on top of the wedge guides 50. The stator opening 44 receives the apparatus 22 (FIGURES 1, 6, and 10). The inclined tapered faces 34 (FIGURE 6) of the irons 32 are at the lower end 70 (FIGURE 1) of the stator 10. When the operation starts, the stripper 80 is then moved upward by a pusher tube 82 positioned around an adjustment stem 84. As the stripper 80 is moved upward, it carries the apparatus 22 (and associated elements) upward also. The tapered faces 34 of the irons 32 and then the irons 32 enter the slots 12, pushing the main coils 14 outwardly or further into the slots 12 as shown in FIGURES 6 and 7. The irons 32 compress the main coils 14 to permit the auxiliary coils 16, 18 to be moved upwardly into the slots 12 by the stripper 80. As the stripper 80 moves upward, it engages the upper sections 86 of the coils 16, 18, moving them toward the stator 10 (FIGURES 1, 6, 7 and 8) along the fingers 48. During this time, the irons 32 are still within the stator slots 12 (FIGURE 7). Thus, the loose main coils 14 (FIGURE 6) are placed under compression and remain compressed while entry of the auxiliary coils 16, 18 by the stripper 80 is initiated. The auxiliary coils 16, 18 are pushed along the fingers 48, pushed along the inclined faces 92 of the wedge guides 50, and pushed into place in the stator slots 12 as successively indicated in FIGURES 6, 7, 8. As the stripper 80 and the apparatus 22 have been moving, the wedge pushers 60 have also been moving upward. The wedge pushers 60 move upward with the stripper 80 so that their respective wedges 20 are just behind the irons 32. While the lower ends 40 of the irons 32 are still within the slots 12 and in engagement with the main windings 14 to hold the main windings 14 outwardly compressed, the wedges 20 enter the slots 12 (FIGURE 7) at the lower end 70 of the stator 10. Continued movement of the wedge pushers 60 effects entry of the wedges 20 into their respective slots 12 (FIGURE 8), overlying the now inserted auxiliary coils 16, 18 and subjacent main coils 14, as shown in FIGURE 8. As the lower ends 40 of the irons 32 leave the stator 10, the stripper 80 has effected a complete entry of the auxiliary coils 16, 18 to the position shown in FIGURE 8, and the wedges 20 have been fully inserted into the stator slots 12 by the wedge pushers 60. After the assembly of coils is completed (FIGURE 8), the apparatus 22 is then lifted off the rod 33 through the opening 44 and removed, and then the stator 10 is removed. The upper and lower sections of the auxiliary coils 16, 18 can be formed outwardly by a suitable tool in any manner desired.

The operation, as described, occurs with considerable speed and accuracy. The operation can continue as quickly as auxiliary coils are mounted on the machine. The process is capable of assembling the windings into the slots in a rapid and accurate manner, and much more conveniently and with greater speed than prior art methods. Consequently, the lead time and the cost of manufacture is substantially reduced. The apparatus also assists in rapidly locating a stator having main coils therein. The tapered faces 34 of the irons 32 urge the external loops of the coils 16, 18 outwardly on the inclined faces 92 of the wedge guides 50. This prevents the wires 58 (FIGURE 10) from being bent across and obstructing the wedge leg area which could otherwise cause wedge jamming upon insertion into the stator.

Reference is hereby made to Patent Number 3,324,536 granted June 13, 1967, and entitled: "Coil Assembling Apparatus." The mechanism for operating the present invention may be in accordance with the apparatus shown and described in this copending application. It is not essential, however, that the present invention be restricted to such operating mechanism and reference is made thereto only for the convenience in understanding the full scope of the present invention.

Although the present invention has been illustrated and described in connection with a single example embodiment, it will be understood that this is illustrative of the invention and is by no means restrictive thereof. It is reasonable to expect that those skilled in this art can make numerous revisions and adaptations of the invention, and it is intended that such revisions and adaptations will be included within the scope of the following claims as equivalents of the invention.

We claim:

1. A process for inserting prewound coils into the slots of stators and the like, comprising the steps of: passing an ironing member endwise into a slot having a first prewound coil loosely positioned therein to effect compression of said first coil into a smaller segment of said slot, simultaneously carrying a second coil into position behind said ironing member wherein said second coil at least partially enters said slot longitudinally while said first coil is maintained at least under partial compression, and simultaneously covering said second coil with insulation as said second coil is entered into said slot to provide a compressed mass of superimposed coils and withdrawing said ironing member from the stator.

2. A process for inserting prewound coils into the slots of stators and the like, comprising the steps of: passing an ironing member endwise into a slot having a first prewound coil loosely positioned therein to effect compression of said first coil into a smaller segment of said slot, simultaneously carrying a second coil into position wherein said second coil at least partially enters the slot longitudinally while said first coil is maintained at least under partial compression, and simultaneously inserting a wedge endwise within said slot and over said second coil as said coils are at least partially compressed to provide a clearance for the endwise insertion of said wedge and withdrawing said ironing member from the stator.

3. A process for assembling coils into the slots of stators and the like, comprising the steps of: mounting a plurality of first coils loosely within selected ones of the slots in said stator, passing a plurality of ironing tools into selected ones of said slots endwise to effect compression of said first coils to a smaller volume in said selected slots, applying longitudinally second coils within said selected slots while said first coils are under at least partial compression, and thereafter drawing said second coils into said selected slots and concurrently inserting a wedge endwise into each of said selected slots over said second coils and withdrawing said ironing tools from the stator.

4. Apparatus for assembling coils into the slots of stators and the like, comprising movable ironing means for at least partially entering endwise and compressing first coils of conducting wire positioned within the slots, means movable with said ironing means for inserting longitudinally second coils into at least one of said slots while said first coils are under at least partial compression, and means movable with said ironing means for thereafter inserting a wedge endwise into said one slot while said second coil is being pushed into said one slot.

5. Apparatus for assembling coils into a slot of stators and the like, comprising movable ironing means for at least partially entering endwise and thereby compressing first coils of conducting wire received within the slot, means movable with said ironing means for inserting longitudinally second coils into said slot while said first coils are under at least partial compression, means movable with said ironing means for thereafter inserting a wedge endwise which is passed into said slot while said second coils are being pushed positively into said slot, and fixed guide means for directing said second coils into operative position.

6. Apparatus for assembling coils into the slots of stators and the like, comprising movable ironing means for at least partially entering endwise and thereby compressing a first set of coils of conducting wire received within a slot, means movable with said ironing means for inserting longitudinally a second set of coils into said slot while said first set of coils is under at least partial compression, means movable with said ironing means for inserting a wedge endwise into said slot and over said second set of coils while said second set of coils is being pushed positively into said slot, and fixed guide means for directing said second set of coils into operative position.

7. Apparatus for assembling coils into the slots of stators and the like, comprising circular tool means having a plurality of circumferentially spaced irons having inclined faces thereon which are proportioned for endwise entry into the slots of said stator, means for passing said irons through the stator opening to effect endwise entry of said irons into said slots and effect compression of first coils therein into a smaller space, a stripper movable with said irons for guiding second coils longitudinally into said slots in overlying relation with said first coils and while said first coils remain under at least partial compression, and a plurality of circumferentially spaced wedge pushers movable with said irons for inserting endwise a wedge into at least one of said slots while both said coils are at least partially compressed within said slots.

8. Apparatus for assembling coils into the slots of stators and the like, comprising circular tool means having a plurality of circumferentially spaced movable irons including inclined faces thereon which are proportioned for endwise entry into the slots of said stator, means for moving said irons longitudinally through the stator opening to effect entry of said irons into said slots and effect compression of first coils previously inserted therein into a smaller space, and means movable with said moving means for guiding second coils longitudinally into said slots in overlying relation with said first coils and while said first coils remain under at least partial compression.

9. Apparatus for assembling coils into the slots of stators and the like, comprising circular tool means having a plurality of circumferentially spaced irons including inclined faces thereon which are proportioned for endwise entry into slots of said stator, means for moving said irons longitudinally through the stator opening to effect entry of said irons into said slots and effect compression of first coils previously inserted therein into a smaller space, means movable with said moving means for guiding second coils longitudinally into said slots in overlying relation with said first coils and while said first coils remain under at least partial compression, and a plurality of pushers movable with said moving means for inserting wedges endwise into said slots while said coils are at least partially compressed within said slots.

References Cited

UNITED STATES PATENTS

| | | | |
|---|---|---|---|
| 2,508,850 | 5/1950 | Wirth | 310—215 |
| 2,998,540 | 8/1961 | Phillips | 310—214 |
| 3,324,536 | 6/1967 | Hill | 29—205 |

JOHN F. CAMPBELL, *Primary Examiner.*

C. E. HALL, *Assistant Examiner.*